United States Patent Office 3,838,077
Patented Sept. 24, 1974

3,838,077
HYDROLYSIS PROCESS FOR POLYMER-MODIFIED CELLULOSE FIBERS
Henry Wilbert Hoftiezer, Rothschild, and August Henry Tilloson, Schofield, Wis., assignors to American Can Company, Greenwich, Conn.
No Drawing. Filed July 10, 1972, Ser. No. 270,324
Int. Cl. C08f 25/00, 27/14
U.S. Cl. 260—17.4 GC    7 Claims

ABSTRACT OF THE DISCLOSURE

This invention relates to an improved procedure for carrying out an alkaline hydrolysis of polymeric nitriles graft polymerized on fibrous cellulose to obtain cellulose having chemically attached thereto alkali metal polycarboxylate salts in a form which may be readily dried and reduced to a fine powderous state which is readily redispersable in aqueous media. In a particular aspect thereof, the invention relates to an improved method for hydrolysis of polyacrylonitrile-grafted cellulose fibers which, on alkaline hydrolysis carried out by conventional procedures in relatively dilute caustic, are converted into a highly viscous suspension of the cellulose fibers having alkali metal polyacrylate grafted therein and thereon. This viscous material has been found to be extremely difficult to dry to a substantially water-free state, and it is to this problem that the present invention is directed.

BACKGROUND OF THE INVENTION

Cellulose fibers may be modified in their characteristics and properties by suspending the fibers in an aqueous medium and contacting the resultant fiber slurry with acrylonitrile together with a redox type catalyst such as ferrous ion-hydrogen peroxide, whereby polyacrylonitrile is formed and chemically united or grafted in and on the cellulose molecule by an in situ polymerization, as described, for example, in U.S. Pat. 3,194,727, issued July 13, 1965. The hydrolysis of the polymer-grafted cellulose fibers in a 2–10% slurry in water is also described in the above patent. The resultant reaction mass is, however, a very gelatinous material from which it is extremely difficult to remove the water by normal drying procedures since, on partial drying, a crust forms on the exterior surface of the gelatinous mass while the inner portion thereof remains glue-like and cannot be freed of water except at high temperature or over inordinate periods of time. Furthermore, if elevated temperatures are utilized in the drying process, the dried reaction mass is not only hard, horny and difficult to grind into a powder, but is also of uneven composition due to local deteriorative effects of the heating process and is also difficult to redisperse in water.

It has now been found that the above problems may be obviated and the hydrolyzed, polymer-grafted fibrous cellulose product greatly improved in ease of drying, pulverulence, water dispersability and particularly in the viscosity-building characteristics of the product when the alkaline hydrolysis of the polyacrylonitrile-grafted cellulose fibers is carried out at very high solids concentration and the hydrolyzed polymer-grafted cellulose product is subjected to a curing process over an extended period of time in accordance with the procedures to be described in detail hereinafter.

SUMMARY OF THE INVENTION

In summary, this invention encompasses the alkaline hydrolysis of the water-insoluble graft polymer material formed by an in situ polymerization of acrylonitrile or closely related monomers in and on natural cellulose fibers from wood, straw, cotton, bagasse, hemp or the like, the hydrolysis being carried out at such high solids concentration (from 30–60% solids) that the graft polymer remains throughout in a slightly dampened, porous, crumb-like mass, followed by a curing process carried out on the damp, hydrolyzed reaction mass over an extended period of time. The curing process involves retention of the hydrolyzed mass in a damp condition for periods ranging up to several weeks depending on the retention temperature and preferably includes successively alternating periods wherein the damp, crumbly hydrolysis product is held at elevated temperatures, followed by periods of holding at room temperature, as will be described herein.

For purposes of simplification, in this application the alkaline hydrolysis of polyacrylonitrile-grafted cellulose fibers will be referred to as a slurry hydrolysis when carried out in the presence of sufficient water to form a continuous phase in which the solid fibers are dispersed. The solids content of such a slurry system can range from a fraction of 1% up to about 25%. In contradistinction to the slurry hydrolysis carried out in relatively dilute aqueous suspension, the hydrolysis of polyacrylonitrile-grafted cellulose fibers in solids concentrations ranging from about 30% to about 60% will be herein referred to as a crumb hydrolysis because of the appearance of the reaction mass as a damp, porous, crumb-like agglomerate. At these higher solids concentrations, the amount of aqueous medium is insufficient to form a continuous dispersing phase in which the solids are suspended, the water, in this case, being dispersed throughout the crumb-like mass of polymer-modified fibers.

The process of this invention cannot be extended to include the hydrolysis, at high concentrations, of polyacrylonitrile, per se, nor has it been successfully applied to polyacrylonitrile-modified starch, for example. Although these materials may be successfully hydrolyzed in the relatively dilute aqueous suspensions encompassed by the limits of the slurry system hydrolysis mentioned hereinbefore, attempts to hydrolyze these products at solids concentrations in the range described above as constituting a crumb hydrolysis have been completely unsuccessful. The invention, then, relates specifically and substantially exclusively to the crumb hydrolysis procedure as applied to the product obtained by an in situ graft polymerization of acrylonitrile or a closely related monomer on cellulose fibers.

If the hydrolysis of the polyacrylonitrile-modified cellulose fibers is carried out in the presence of a minimum of water, and with no other solvent present, the fibrous cellulose-based material remains as a continuous phase in the system rather than as a disperse phase in the aqueous alkaline medium. Surprisingly, the hydrolysis of the nitrile groupings to the corresponding carboxylate groups proceeds more completely; i.e., a higher percentage of nitrile is converted to carboxylate than in the customary hydrolysis reaction in dilute solution. Further, since the aqueous alkaline medium is dispersed in the solid polymer-modified fibrous mass, rather than the reverse situation which is customary, the cellulosic fibrous material remains throughout the reaction as a porous, crumb-like material from which water and the ammonia generated in the hydrolysis easily escape to leave a dry, easily disintegrable product. The product is also readily re-wet by water and when dispersed in aqueous media, develops very high viscosities at very low solids concentration. This property of high viscosity in water may be further enhanced by proper treatment of the damp hydrolysis product.

The process for hydrolysis of the polyacrylonitrile-modified cellulose fibers which is the subject of this invention is illustrated by the following examples.

DESCRIPTION OF A PREFERRED EMBODIMENT OF THE INVENTION

In a suitable process for preparing the polymer-modified cellulose fibers which are the preferred starting material of this invention, cellulose fibers are suspended in an aqueous medium, a ferrous salt is added and allowed to penetrate the cellulose fiber structure, and the appropriate monomer, together with the hydrogen peroxide portion of the catalyst couple, is then added and the polymerization carried out under reflux conditions. Suitable monomers which may be polymerized in situ in and on the cellulose fibers are acrylonitrile, methacrylonitrile, methyl acrylate and ethyl acrylate, all of which form polymer grafts with cellulose fibers which, on alkaline hydrolysis with a hydroxide of sodium, potassium or ammonium, yield the corresponding salts of polyacrylic acid or alkyl substituted polyacrylic acid grafted to the cellulose fibers.

Fibrous cellulose material suitable for use in the reaction may be obtained from wood, straw, hemp, bagasse or similar lignocellulosic fibers by any of the customary chemical pulping procedures suitable for separating cellulose fibers from the lignin normally present in the raw material. Cotton fibers may also serve as a source of the desired cellulose. By virtue of the abundance of wood as a raw material and the economic advantages associated with the use of wood cellulose fibers, these fibers, either bleached or unbleached, constitute the preferred starting material for use in this invention. It is considered, however, that it is quite within the intent and scope of this specification to substitute cellulose fibers from one of the other available sources for those obtained by chemical pulping of wood.

The following examples illustrate the preparation of polyacrylonitrile-modified cellulose fibers which are useful as the starting material for the hydrolysis procedure of this invention.

Example 1. 1500 grams of bleached western softwood kraft pulp were added with 20 liters of water and 1.8 grams of ferrous ammonium sulfate hexahydrate to a steam jacketed ribbon blender reactor equipped with a reflux condenser. The pH was adjusted to 3.9 with 10% sulfuric acid. After mixing and heating to 90° C. in a nitrogen atmosphere, the pulp slurry was cooled to 60° C. and 3.75 liters of inhibitor-free acrylonitrile and 38 milliliters of 10% hydrogen peroxide were added under agitation. The mixture was refluxed moderately for an hour and unreacted acrylonitrile was stripped from the reactor, leaving a product containing 58% polymerized acrylonitrile grafted to the cellulose fibers.

The molecular weight of the polyacrylonitrile portion of the polymer-grafted fibrous cellulose material resulting from the above polymerization carried out in the presence of cellulose fibers has been estimated to be in the range of 75,000 to 125,000 although, by some modifications of the catalyst utilized and the polymerization procedure, polymer weights ranging from 25,000 to as much as 1,000,000 have been recorded. For the present purpose, a molecular weight of the polyacrylonitrile portion of the product between about 25,000 and 500,000 is preferred.

Example 2. The process of Example 1 was followed to react 10 pounds of bleached Canadian softwood kraft wood pulp with 29 pounds of inhibitor-free acrylonitrile. The pulp was slurried in 38 gallons of water with 11.5 grams of ferrous ammonium sulfate hexahydrate and the pH adjusted to 3.9. The prescribed amount of acrylonitrile was added, followed by 230 milliliters of 10% hydrogen peroxide and the reaction mixture refluxed for an hour. The polymer-grafted fibers contained 67% polymerized acrylonitrile, or 20 lbs. of the polymer chemically grafted in and on the 10 lbs. of cellulose fibers.

The water-insoluble, polymer-grafted cellulose fibers obtained according to the above examples may be converted by hydrolysis with an alkali metal hydroxide or ammonium hydroxide to the corresponding metal or ammonium salt of the polyacrylic acid-cellulose fiber graft composite. For the purposes of this specification and claims, the term "alkali hydroxides" is intended to include the hydroxides of the alkali metals and ammonia. The resulting cellulose fibers modified by having polyacrylate salts chemically bonded therein and thereon have hitherto been obtained as a result of such alkaline hydrolysis in the form of slippery, gelatinous pastes of high (90–98%) water contents which are very difficult to reduce to dryness by standard drying techniques. Furthermore, the properties of the resultant dried fibrous polymer-grafted cellulose are found to be adversely affected by the drying procedure. Specifically, the water-insoluble, fibrous polymer-grafted cellulose product of the hydrolysis is significantly darker in color after drying and the viscosity of a given concentration of the dried product dispersed in water is substantially lower than that of a dispersion of the same concentration which has never been subjected to the drying operation. This latter property is of substantial significance when the polymer-grafted fibrous material is utilized as a viscosity builder in aqueous systems such as latex paints, cosmetics and the like.

Example 3. 20 parts by weight of sodium hydroxide were dissolved in 20 parts by weight of water to give a 50% solids aqueous solution of caustic soda. This solution was added to 40 parts (calculated as dry weight) of the polymer-grafted cellulose product of Example 1 containing 20 parts of water while the Example 1 product was being agitated in a crumb-like state in a ribbon type blender. The resulting reaction mass of about 60% solids content was heated for 90 minutes at 90° C. At the end of the hydrolysis period, the damp, porous, crumb-like polymeric mass contained cellulose fibers having grafted therein and thereon primarily the sodium salt of polyacrylic acid, about 80% of the nitrile groups having been converted by hydrolysis to the corresponding carboxylate salt. It is assumed that the remainder of the nitrile groups either remained unchanged or partially converted to an intermediate state between the nitrile and the carboxylate.

In the above crumb hydrolysis reaction, the proportions of the ingredients are such that the solid materials involved, consisting of polymer-grafted fibers and caustic soda, represent 60% of the total mass, the aqueous or liquid fraction being only 40% of the whole. Since this amount of water is insufficient to disperse the polymer-grafted fibers, the reaction mass remains in a porous, crumbly mass which is merely dampened by the aqueous medium, thus making it easy to remove the water in subsequent conventional drying operations. A 3% aqueous slurry of the damp hydrolysis product, mixed for 5 minutes in a Waring Blender, had a viscosity of over 7,000 centipoises (cps.) at 23° C. as measured by a Brookfield viscometer at 10 r.p.m. spindle speed.

Example 4. 10 parts by weight of solid sodium hydroxide were dissolved in 15 parts by weight of water to give a 40% solids aqueous solution of caustic soda. This solution was added to 20 parts (calculated as dry weight) of the polymer-grafted cellulose product of Example 2 which had been mixed with 55 parts of water in a ribbon blender. The total solids concentration of the resulting reaction mass was, therefore, 30% by weight. The reaction mass was heated 90 minutes, under ribbon blender agitation, at a temperature of 90° C. During this period, the dampened mass of fibrous, polymer-modified cellulose material remained as a porous, crumbly mass rather than as a slurry of solids in a liquid, as would have been the case in a more dilute system. During the hydrolysis, ammonia is evolved and the resulting product represents a 50–80% conversion of the polyacrylonitrile to a sodium polyacrylate salt chemically grafted on the cellulose fibers.

The relative proportions of water and solids utilized in the crumb hydrolysis may be varied within the limits given for Examples 3 and 4. Hydrolysis carried out a higher solids concentrations than that utilized in Example 3 (60% solids) is generally less desirable in that the polymer-grafted fibers are not evenly wet by the aqueous medium and hydrolysis therefore tends to be spotty and uneven, the resulting product therefore having generally a lower percentage of conversion to the polyacrylate salt. If the hydrolysis is carried out in substantially more dilute suspension than 30% solids, the aqueous phase tends to become continuous and a slurry is formed which is very difficult to dry to a substantially water-free solid, as explained previously. The preferred conditions for carrying out the hydrolysis according to this invention are therefore between about 30% and 60% solids concentration, all proportions being considered throughout this application on a weight basis.

Preferably, the caustic alkali is present in the hydrolysis mixture in an alkali to polymer-modified fiber ratio of between 1 to 4 and 1 to 1, depending on the polymer-to-fiber ratio, higher proportions of alkali being required when the polymer content of the polymer-modified fibers is high.

Example 5. Following the general procedure set forth in Examples 3 and 4, 15 parts by weight of sodium hydroxide were dissolved in 35 parts of water to form a 30% solids solution of caustic soda. The caustic solution was then added to 30 parts (dry basis) of polyacrylonitrile-modified fibers (polymer-to-fiber ratio = 2.5 to 1) moistened with 20 parts of water while under agitation in a crumb-like state in a steam jacketed ribbon blender. The resulting reaction mass of 45% solids concentration was heated at 90° C. for 90 minutes, during which ammonia was evolved. The resulting damp, crumb-like hydrolysis product contained primarily sodium polyacrylate-modified cellulose fibers which were readily dried at moderately elevated temperatures either before or after storage in the damp state as described in detail hereinafter, yielding material of value in enhancing the viscosity of aqueous systems.

It has been found that the viscosity building properties of the hydrolyzed, polymer-grafted fibers may be greatly improved if the damp, crumb hydrolyzed product is stored for a period of time at room temperature. For example, the following Table I shows the effect of such storage of the damp, hydrolyzed fibrous material of Example 5. The viscosity data given in the table were obtained at 23° C. with a Brookfield viscometer having a spindle speed of 10 r.p.m. The suspensions tested consisted of 1.5% solids water dispersions of the product of Example 5 stored in the damp state at room temperature for the indicated period of time.

TABLE I

Effect of storage of damp, hydrolyzed, polymer-grafted fibers on viscosity of aqueous suspensions [1]

| Period of Storage in Days: | Viscosity in cps.[2] |
| --- | --- |
| 3 | 50 |
| 14 | 130 |
| 17 | 180 |
| 28 | 350 |
| 56 | 2,400 |
| 112 | 27,000 |
| 182 | 30,000 |

[1] Suspensions prepared by adding the Example 5 product to water and agitating 5 minutes in a Waring Blender.
[2] Viscosity in centipoises of a 1.5% solids suspension at 23° C.

Similarly, if the crumb hydrolyzed, fibrous product is stored in the damp state at room temperature for a period of time and subsequently dried, ground to a fine powder and redispersed in water, the resulting viscosity of the aqueous suspension is found to be profoundly influenced by the period during which the damp fibers were aged. Table II contains data on the viscosity of 3% solids suspensions in water of the product of Example 5 stored in the damp state for varying periods of time, dried at 105° C. for 7 hours, ground in a vibrating ball mill to a fine pulverulent state and redispersed in water. The viscosities were measured in centipoises at 23° C. on a Brookfield viscometer with a spindle speed of 10 r.p.m., after agitating the aqueous suspension for 5 minutes in a Waring Blender to thoroughly disperse the solid, pulverulent fibrous material.

TABLE II

Effect of storage, drying and grinding on viscosity

| Age of Hydrolyzed Polymer Before Drying and Grinding: | Viscosity in cps.[1] |
| --- | --- |
| 3 days | 1,200 |
| 182 days | 38,000 |

[1] Viscosity of 3% aqueous suspension at 23° C. in cps.

The data from the preceding Tables I and II clearly indicate the effect of aging of the damp, crumb hydrolyzed, polymer-modified cellulose fibers on the viscosity of aqueous suspensions thereof, whether the suspensions are made from the damp, never-dried fibers or from similar material which had been dried and pulverized before making the final aqueous suspension.

It has also been found that the viscosity building characteristics of the crumb hydrolyzed, polymer-modified cellulose fibers may be further enhanced if, instead of maintaining the hydrolysis product at room temperature for an extended period of time, the product is maintained at an elevated temperature or, surprisingly, if the material is cycled periodically between an elevated temperature and room temperature. Particularly, it has been determined that each such cycling between room temperature and a moderately elevated temperature results in a remarkable increase in the viscosity-building properties of the graft polymer product. These effects are demonstrated by the data in the following Table III. In producing the hydrolyzed, polymer-grafted cellulose fiber utilized to obtain the data for Table III, a bleached Canadian hardwood kraft pulp was treated in the manner of Example 2, above, to obtain a polyacrylonitrile-grafted cellulose fiber product having 245 parts by weight of acrylonitrile to 100 parts of cellulose pulp fibers, the product thus containing 71% polyacrylonitrile. This material was crumb hydrolyzed with caustic soda at 45% solids concentration in accordance with the procedure of Example 5, above, and the damp, hydrolyzed fibrous product mass treated in the following manners. Sample A was held at 23° C. for 14 days. Sample B was held at 23° C. for 11 days and then was held at 68° C. for 3 days.

Sample C was held at 23° C. for 10 days and then subjected to four cycles of 16 hours holding at 68° C. followed by 8 hours holding at 23° C.

At the end of the 14 day aging period, the respective damp test samples were dispersed in water to a 1.5% solids concentration, agitated in a Waring Blender for 5 minutes and the viscosity of the suspensions determined at 23° C. with a Brookfield viscometer at a spindle speed of 10 r.p.m.

The results are given in Table III.

TABLE III

Effect of aging method on viscosity building properties

| Sample: | Viscosity in cps. |
| --- | --- |
| A | 150 |
| B | 8,400 |
| C | 25,000 |

The data in the above Table III clearly indicate both the effect of temperature of storage of the damp hydrolysis product and the effect of cycling between a higher and a lower temperature on the viscosity development properties of cellulose fibers modified by the chemical grafting thereon of alkali metal polyacrylate. In obtaining the data on Sample C, above, it is to be noted that after one cycling between 68° C. and 23° C., the viscosity of a 1.5% suspension of the product was 1,000 cps., two cyclings produced a viscosity of 6,100 and three cyclings resulted in a viscosity of 22,000, all measured in 1.5% solids suspension at 23° C. with the Brookfield instrument. It is thus apparent that the effect produced by a periodic change in temperature between 23° C. and 68° C. is more effective in enhancing the viscosity building character of the hydrolyzed graft polymer than storage at either temperature.

Further experimentation has established that cycling of the damp hydrolyzed product between 68° C. and 23° C. more than four to six times is unnecessary since continued cylinding fails to further increase the viscosity building properties to a significant degree, if the cycling is carried out in such manner that the entire mass of material is assured of attaining the specified temperature and being maintained at such temperature for a period of several hours at least. For example, if the damp, hydrolyzed product of Examples 3, 4 and 5, above, is subjected to four cycles of 16 hours in an oven at 68-70° C. followed by 8 hours at room temperature, it is found that further cyling increases the viscosity-building characteristics of the material only minimally. Similarly, 5 cycles of storage of 8 hours in a 70° C. oven and 16 hours at room temperature or 6 cycles of 4 hours at 68-70° C. and 20 hours at room temperature also produce substantially maximum viscosity-building properties. On the other hand, as many as 14 cycles of 1 hour in a 68° C. oven and 1 hour of holding at room temperature fail to develop maximum viscosity properties, presumably because the mass of product failed to reach the temperature of either of the environments in the short period of storage allotted in each case.

Generally, it is preferred that the damp hydrolysis product be stored for at least 4 hours in each temperature environment in order to assure equilibrium and that storage be alternated at least four times between the environments. The temperatures may be varied substantially within certain limits. The elevated temperature may be between about 50° C. and about 100° C. and the lower temperature should be below about 30° C. and preferably is about 18-25 C., or normal room temperature. Lower temperatures are quite satisfactory but are economically less desirable since their maintenance requires mechanical cooling.

The efficacy of the hydrolyzed, polymer-grafted cellulose fibers in the thickening of aqueous systems is influenced by a number of factors, some of which exert a profound influence on the product and some of which exert only a minor influence. Among the influential factors are the type of cellulose fibers used as a base for the polymer-grafting operation, the amount of polymer grafted on the fibers, the solids concentration of the hydrolysis reaction mass and the treatment of the hydrolyzed product after hydrolysis, including the temperature and duration of storage of the product in a damp state, the procedure utilized for drying and the degree to which the dried product is subjected to milling or grinding procedures prior to its re-slurrying in water.

The source of the cellulose fibers used as a base for the polymer-grafting procedure is of relatively slightly significance in thed etermination of the properties of the final product. Fibers from both hardwood and softwood trees have proven quite satisfactory, whether pulped by the sulfite, kraft (sulfate) or soda process, and pulp obtained from Canadian wood and pulp from both Western United States and Southern United States sources have also proven satisfactory for the purposes of this invention.

By a slight margin, the hydrolyzed, polymer-grafted fibers having the most desirable viscosity-building characteristics in aqueous systems are derived from bleached southern softwood kraft pulp and this type of pulp might therefore be considered, to a slight extent, preferable for use in this invention over the many other forms of fibrous cellulose which may also be used.

If the hydrolysis of grafted polyacrylonitrile to polyacrylate is carried out in a sufficiently dilute suspension (2–10% solids concentration approximately) so that the aqueous phase is continuous and the fibers are suspended in the aqueous medium as a slurry, products with the greater thickening power are obtained from polymer-grafted fibers bearing between 50 and 150 parts by weight of polymer per 100 parts of cellulose fibers. Products with even greater thickening power are obtained by crumb hydrolysis of cellulose fibers grafted with higher polymer-to-fiber ratios, the hydrolysis being carried out at a solids content of between 30 and 60%, as previously described. This relationship is illustrated by the data in Table IV wherein the viscosity of aqueous suspensions of the products of a slurry hydrolysis in relatively dilute suspension (9% total solids concentration) are compared to viscosities of suspensions of the products of a crumb hydrolysis carried out at about 45% total solids concentration.

In obtaining the data for Table IV, southern softwood kraft pulp was treated with acrylonitrile while in aqueous suspension with ferrous ion-hydrogen peroxide catalyst substantially as described in Example 1 except that the amount of acrylonitrile was varied in three successive runs to leave, respectively, 64, 100 and 184 parts by weight of polyacrylonitrile grafted in an on each 100 parts of cellulose fibers. The polymer-grafted fibrous product from each run was separated into two parts, one portion being slurry hydrolyzed at 9% total solids with caustic soda, the other being crum hydrolyzed at 45% solids concen tration in general accordance with Example 5, above, except that the polymer-to-fiber ratio was varied as shown in Table IV. After the hydrolysis reactions had been completed, the wet hydrolyzed products were each suspended in water at a solids concentration of 3% and agitated for 5 minutes in a Waring Blender, which causes substantial shearing and fiber degradation in the suspended material. The viscosities of the resulting suspensions were determined at 23° C. with a Brookfield viscometer at 10 r.p.m. spindle speed and the results recorded in Table IV.

TABLE IV—EFFECT OF SOLIDS CONCENTRATION DURING HYDROLYSIS ON VISCOSITY OF HYDROLYZED POLYMER-GRAFTED FIBERS

| Amount of polymer on fiber in parts/100 parts of fiber | Solids concentration of hydrolysis reaction, percent | Viscosity in cps., at 23° C. (3% solids) |
|---|---|---|
| 64 | 9 | 3,800 |
| 100 | 9 | 9,100 |
| 182 | 9 | 7,800 |
| 64 | 45 | 8,300 |
| 100 | 45 | 16,000 |
| 182 | 45 | 22,000 |

The data in the above Table IV clearly show that the material hydrolyzed at 45% solids concentration is a more effective thickener than that hydrolyzed at 9% solids.

It is also evident from the data in the foregoing Table IV that, in the material hydrolyzed at high solids concentration, the most effective thickening agent was that having the highest polymer-to-fiber ratio (182 parts of 100 parts of fiber).

Further data indicate the usefulness of products with polymer-to-fiber ratios to between about 0.5 to 1 and 5.0 to 1, the preferred range being from 1.5 to 1 and 3.0 to 1 for the development of the most desirable properties of absorptiveness and viscosity enhancement.

The polymer-modified cellulosic fibers having substantially higher polymer-to-fiber ratios than those hereinbefore stated have properties more closely approaching those of homopolymeric polyacrylonitrile, which does not lend itself to hydrolysis by the crumb method. That is, the polymer-modified fibers of very high polymer-to-fiber ratio tend to form sticky masses upon hydolysis at high solids concentrations and are therefore much more difficult to handle and the product is not uniform in quality.

In further confirmation of the remarkable effect of cycling the damp high solids concentration hydrolysis product between a moderately elevated temperature (68° C.) and room temperature (23° C.), portions of each of the three polymer-grafted fibrous cellulose products prepared as described above and hydrolyzed at high (45%) solids concentration were sealed in glass jars and held alternately for 16 hours in an oven at 68° C. and then at room temperature for 8 hours, this cycle being repeated four times. The samples of hydrolyzed polymer-grafted fibers of each polymer-to-fiber ratio which had been subjected to the cyclic, varied temperature curing procedure were then suspended in water at a solids concentration of 3% and viscosity measurements made with a Brookfield viscometer with a 10 r.p.m. spindle speed. The sample having a polymer-to-fiber ratio of 64 parts per 100 parts of fiber gave a viscosity in 3% suspension of 19,000 cps., the 100 parts to 100 parts sample gave a viscosity of 26,000 cps. and the sample having 182 parts of polymer to 100 parts of fiber was so thick that it was necessary to dilute the test slurry to 2% solids, at which point the viscosity was determined to be 41,000 cps. These values may be compared to the viscosity data of Table IV wherein are shown the values for the same samples before subjecting them to the cyclic varied temperature curing procedure.

The crumb hydrolysis procedure which is the subject of this invention is also of particular value in the preparation of an alkali polyacrylate-modified cellulose fiber which has exceptional water absorptive and retentive properties. It has previously been known that cellulose fibers, modified by the graft polymerization therein and thereon of alkali salts of polyacrylic acid in a polymer-to-fiber ratio of between 0.5 to 1 and 5 to 1 exhibit a high water absorptive capacity in comparison to unmodified cellulose fibers, for example. Untreated wood pulp cellulose fibers will absorb and retain between 90% and 120% of their own weight of water when submerged in water and then centrifuged to remove all water not strongly retained by the cellulose. If, however, the cellulose fibers are modified by polymerization of acrylonitrile therein and thereon by the process of Example 1, supra, followed by an alkaline hydrolysis carried out with sodium hydroxide by the slurry method at 10% total solids concentration, the resulting sodium polyacrylate-modified fibers will retain between 400% and 800% of their own weight of water under test conditions equivalent to those outlined above. It has now been found, however, that, if the hydrolysis of the Example 1 product is carried out at 30–60% total solids concentration by the crumb hydrolysis method of this invention, the water absorption and retention capacity of the resulting polymer-modified cellulose fiber product has increased to between 1,400% and 1,600% of its own weight. This product is of particular value for incorporation in infant diapers, incontinence pads, surgical pads and other products wherein high absorption and retention capacity for aqueous fluids is required.

We claim:
1. In a process for forming an alkali salt of polyacrylic acid grafted on natural cellulose fibers which comprises:
   a. treating an aqueous slurry of natural cellulose fibers with a polymerizable monomer selected from the group consisting of acrylonitrile, acrylamide, methyl acrylate and ethyl acrylate, together with a polymerization initiation catalyst under conditions wherein in situ polymerization of said monomer in and on said cellulose fibers occurs, thereby forming a polymer-modified cellulosic fiber product having a polymer-to-fiber ratio of between 0.5 to 1 and 5.0 to 1, the polymer portion of said product having a molecular weight in the range of 25,000 to 500,000, and
   b. hydrolyzing said polymer-modified cellulose in the presence of aqueous alkali metal hydroxide to form a graft co-polymer of cellulose fibers modified by an alkali metal salt of polyacrylic acid chemically united therewith,
the improvement which comprises carrying out said hydrolysis in a total solids concentration of between 30% and 60% under agitation, thereby to obtain the alkali metal polyacrylate-modified cellulose fiber product as a porous, crumb-like mass having improved drying, grinding, thickening and absorptive properties.

2. A process according to Claim 1 wherein said alkali metal polyacrylate-modified cellulose fiber product is further subjected, while in a damp state, to periodically cycled storage at a first temperature below about 30° C. and at a second temperature above 50° C. but less than 100° C., said cycling to include at least 4 periods of at least 4 hours each at each of said two temperatures.

3. A process according to Claim 2 wherein said first temperature is between about 18° C. and 25° C. and said second temperature is between 60° C. and 80° C.

4. A process according to Claim 3 wherein said monomer is acrylonitrile, said alkali hydroxide is sodium hydroxide and said natural cellulose fibers are fibers obtained by the chemical pulping of wood.

5. In a process for forming sodium polyacrylate-modified cellulosic fibers, which comprises:
   a. polymerizing acrylonitrile in and on natural wood cellulose fibers suspended in an aqueous medium to form by in situ polymerization a polyacrylonitrile-modified fibrous cellulosic product having a polyacrylonitrile-to-fiber ratio of between 0.5 to 1 and 5.0 to 1, the polyacrylonitrile portion of which has a molecular weight of between about 25,000 and 500,000, and
   b. hydrolyzing the said polyacrylonitrile-modified cellulose fibers with aqueous caustic soda at elevated temperature thereby to produce cellulose fibers having sodium polyacrylate chemically bonded therein and thereon,
the improvement which comprises carrying out said hydrolysis under agitation at a total solids concentration of between about 30% and about 60%, the ratio of caustic soda to polymer-modified cellulose fibers in the hydrolysis reaction mixture being between 1 to 4 and 1 to 1.

6. A process for hydrolyzing polyacrylonitrile-modified natural cellulosic fibers wherein polyacrylonitrile having a molecular weight of between 25,000 and 500,000 is chemically bonded in and on said fibers in a polymer-to-fiber ratio of between 0.5 to 1 and 5 to 1 which comprises:
   treating said polymer-modified fibers with an aqueous alkali metal hydroxide at elevated temperature under agitation and at a total solids concentration of between 30% and 60% by weight for a period of time sufficient to convert at least a major portion of said polyacrylonitrile to an alkali salt of polyacrylic acid, said alkali hydroxide being present in the hydrolysis reaction mixture in a ratio of between one fourth part and one part per part of said polymer-modified fibers.

7. A process according to Claim 6 wherein the product of said hydrolysis is further subjected, while in a damp state, to periodically cycled storage at a first temperature below about 30° C. and at a second temperature above 50° C. but less than 100° C., said storage being cycled to include at least 4 periods of at least 4 hours each at each of said first and second temperatures.

References Cited
UNITED STATES PATENTS

| | | | |
|---|---|---|---|
| 3,721,627 | 3/1973 | Adams et al. | 260—17.4 X |
| 3,682,856 | 8/1972 | Adams et al. | 260—17.4 |
| 3,194,727 | 7/1965 | Adams et al. | 162—168 |
| 3,256,372 | 6/1966 | Adams et al. | 260—17.4 |

HERBERT B. GUYNN, Primary Examiner

U.S. Cl. X.R.

8—116; 162—157 C